(12) United States Patent
Wung et al.

(10) Patent No.: US 9,723,694 B2
(45) Date of Patent: Aug. 1, 2017

(54) LIGHT EMITTING DIODE STREET LAMP CONTROL SYSTEM

(71) Applicants: CHAMP TECH OPTICAL (FOSHAN) CORPORATION, Foshan (CN); Foxconn Technology Co., Ltd., New Taipei (TW)

(72) Inventors: Shih-Hsun Wung, New Taipei (TW); Chun-Chi Chen, New Taipei (TW); Chin-Che Hung, New Taipei (TW); Er-Wei Ruan, Foshan (CN); Yong-Xin Chen, Foshan (CN)

(73) Assignee: CHAMP TECH OPTICAL (FOSHAN) CORPORATION, Foshan (CN)

(*) Notice: Subject to any disclaimer, the term of this patent is extended or adjusted under 35 U.S.C. 154(b) by 0 days.

(21) Appl. No.: 14/833,592

(22) Filed: Aug. 24, 2015

(65) Prior Publication Data
US 2016/0309568 A1    Oct. 20, 2016

(30) Foreign Application Priority Data
Apr. 14, 2015    (CN) .......................... 2015 1 0173568

(51) Int. Cl.
H05B 33/08    (2006.01)
H05B 37/02    (2006.01)

(52) U.S. Cl.
CPC ..... *H05B 37/0263* (2013.01); *H05B 33/0845* (2013.01); *H05B 37/0272* (2013.01)

(58) Field of Classification Search
None
See application file for complete search history.

(56) References Cited

U.S. PATENT DOCUMENTS

| | | | |
|---|---|---|---|
| 2012/0139426 A1* | 6/2012 | Ilyes | F21V 23/02 315/152 |
| 2013/0057158 A1* | 3/2013 | Josefowicz | G01S 19/14 315/152 |

* cited by examiner

*Primary Examiner* — Dedei K Hammond
(74) *Attorney, Agent, or Firm* — Steven Reiss

(57) ABSTRACT

A light emitting diode (LED) street lamp control system includes a control module and an LED street lamp unit coupled with the control module. The control module includes a dimmer module, a driving module, and a light source module coupled with the driving module. The dimmer module is coupled with the control module and receives a signal from the control module. The dimmer module also can transmit a signal to the control module. The dimmer module is coupled to the driving module by an access module to control the driving module to control the light source module.

9 Claims, 2 Drawing Sheets

LIGHT EMITTING DIODE STREET LAMP CONTROL SYSTEM

CROSS-REFERENCE TO RELATED APPLICATIONS

This application claims priority to Chinese Patent Application No. 201510173568.8 filed on Apr. 14, 2015, the contents of which are incorporated by reference herein.

FIELD

The subject matter herein generally relates to a control system, and also relates to a light emitting diode (LED) street lamp control system.

BACKGROUND

Generally, a light emitting diode (LED) street control system simply controls an LED street lamp by power outages of the circuit thereof. The LED street lamp control system does not adjust light thereof by remote control, and also does not configure an alarm module therein to control the LED street lamp perfectly and intelligently.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skills in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. The description is not to be considered as limiting the scope of the embodiments described herein.

The term "comprising" means "including, but not necessarily limited to"; it specifically indicates open-ended inclusion or membership in a so-described combination, group, series and the like.

Figure 1:
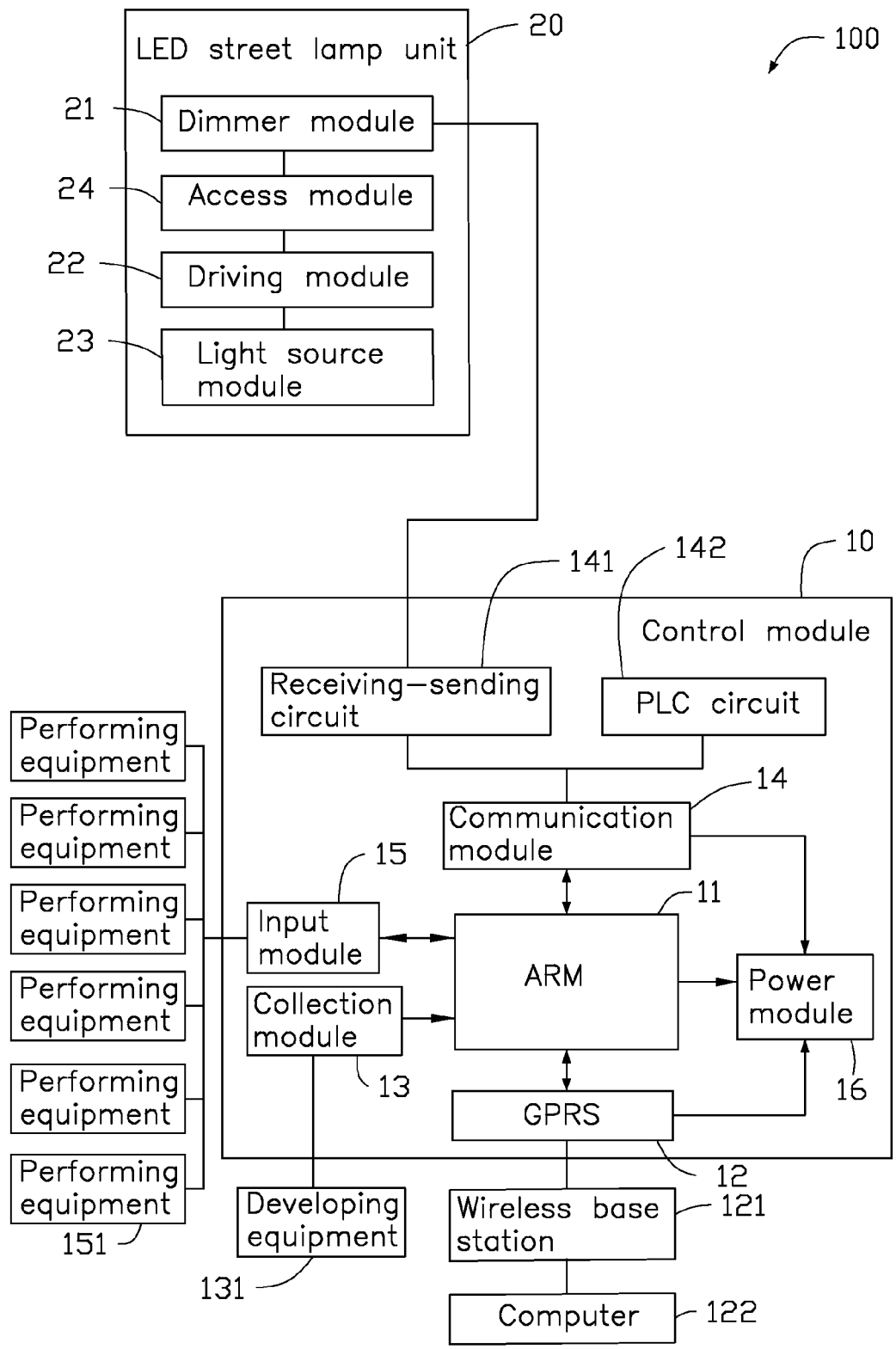
FIG. 1 is a diagrammatic view of the light emitting diode street lamp control system of one embodiment of the present disclosure.

As illustrated in FIG. 1, a light emitting diode (LED) street lamp control system 100 of one embodiment of the present disclosure is configured for controlling luminous state of a LED street lamp. The LED street lamp control system 100 includes a control module 10 and an LED street lamp unit 20 coupled with the control module 10. The control module 10 receives a signal transmitted from the LED street lamp unit 20, and converts the signal to to return to the LED street lamp unit 20 to remote control the LED street lamp unit 20.

The control module 10 includes an Acorn Risc machine (ARM) 11, a General Packet Radio Service (GPRS) 12, a collection module 13, a communication module 14, an input module 15 and a power module 16.

The ARM 11 can be an embedded system board and for the control module 10. The ARM 11 can provide hardware resources and peripheral interfaces for the Linux system. The ARM 11 is coupled with the power module 16 and processes signal transmitted from the LED street lamp unit 20. In the illustrated embodiment, the ARM 11 can be an ARM 9 system.

The GPRS 12 is coupled with the ARM 11 and the power module 16. The control module 10 is coupled to a wireless base station 121 by the GPRS 12 such that the control module 10 can connect to the internet or communicate with a computer 122 connecting to the internet. Thus, the GPRS 12 can transmit signal from the ARM 11 to the computer 122 connecting to internet, and also receive signal from the computer 122 to transmit to the ARM 11.

The collection module 13 is coupled with the ARM 11. The collection module 13 is connected to a plurality of developing equipments 131. The collection module 13 receives signal from the developing equipments 131 to transmit to the ARM 11. In one example, the collection module 13 can be a RS-485 module, the developing equipments 131 are Watt-hour meters.

The communication module 14 is coupled with the ARM 11 and the power module 16. The communication module 14 further includes a receiving-sending circuit 141 and a Power line Communication (PLC) circuit 142. The communication module 14 can modulate and demodulate a carrier signal. Specifically, the communication module 14 modulate the signal received from the ARM 11 to transmit to a power line by the receiving circuit 141 and the PLC circuit 142, and the communication module 14 also demodulates the signal received from the power line to transmit to the ARM 11 by the receiving circuit 141 and the PLC circuit 142.

The input module 15 is coupled with the ARM 11 and a plurality performing equipments 151. The input module 15 receives a signal from the ARM 11 to transmit the signal to the performing equipment 151 to control the running number of the performing equipments 151. So the performing equipment 151 can run in a perfect number. Further, the input module 15 also receives and returns signal from the performing equipment 151 to the ARM 11.

The power module 16 provides power for the control module 10. The LED street lamp unit 20 includes a dimmer module 21, a driving module 22 and a light source module 23. The dimmer module 21 is coupled to the driving module 22 by an access module 24. The driving module 22 is coupled with the light source module 23.

Figure 2:
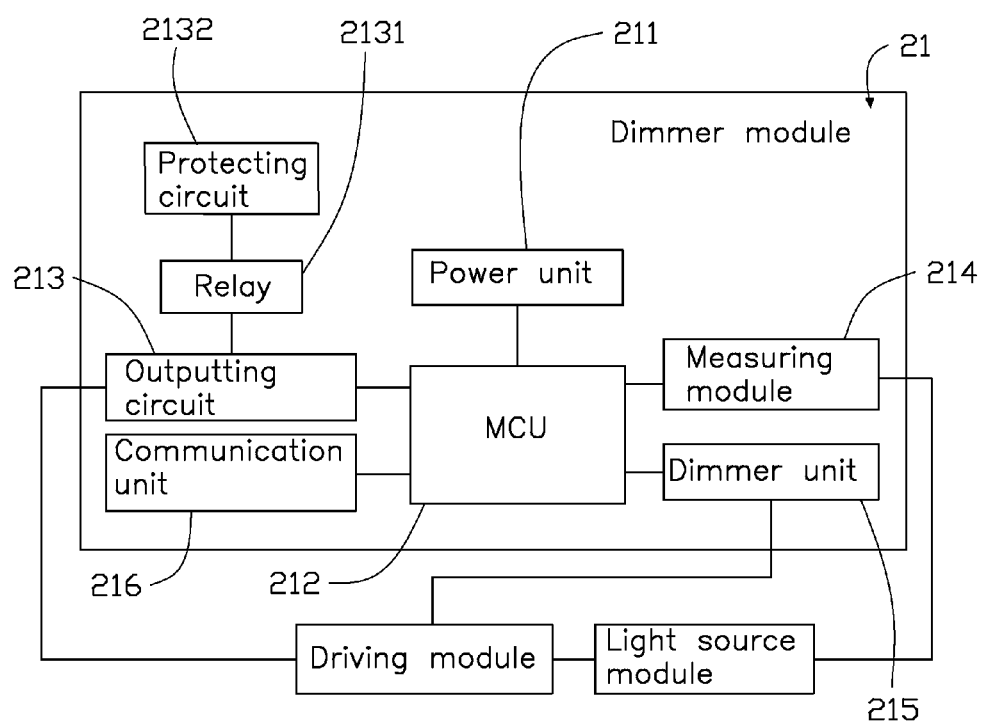
FIG. 2 is a diagrammatic view of a dimmer module of the light emitting diode street lamp control system of FIG. 1.

Also referring to FIG. 2, the dimmer module 21 includes a power unit 211, a Microcontroller Unit (MCU) 212, an outputting circuit 213, a measuring module 214, a dimmer unit 215 and a communication unit 216. The power unit 211 can be a switching power for controlling whether providing power or not to the dimmer module 21. Also, the power unit 211 includes protecting circuit to prevent the dimmer module 21 from a short circuit and an open circuit. In the illustrated embodiment, the power unit 212 provide an alternating current of 176-265V/50 Hz.

The MCU 212 is configured for the communication unit 216 to control whether turn on the light source module 23 or not, and the MCU 212 also couples to and control an alarming system. The outputting circuit 213 is coupled to the light source module 23 by a relay 2131. The relay 2131 couples to a protecting circuit 2132 and ensures that the relay 2131 works normally.

The measuring module 214 monitors data such as a voltage, current and power of the light source module 23 and transmits the data to MCU 212.

The dimmer unit 215 is coupled with the MCU 212 and the light source module 23. The dimmer unit 215 can output a voltage from 0V to 10V. The driving module 22 changes a voltage and current from the power unit 211 properly for the light source module 23 to emitting light. Also, the driving module 22 receives signal from the dimmer unit 215 to adjust light of the light source module 23 by changing current. The light source module 23 includes a plurality of LEDs arranged together.

While the LED street lamp control system 100 is working, the power module 16 provides electrical power for the control module 10. The power unit 211 provides electrical power for the dimmer module 21. The driving module 22 provides electrical power for the light source module 22 to emit light. The MCU 212 receives a signal from the light source module 23 and transmits the signal to the communication unit 216. The communication unit 216 modulates the signal from the MCU 212 and transmits the signal to the communication module 14. The communication module 14 demodulates the signal from the communication module 216 and transmits the signal to the ARM 11. The ARM 11 also receives signal from GPRS 12 to control the collection module 13, the input module 15, and communication module 14. Specifically, the collection module 13 receives signal from the ARM 11 to control the developing equipments 131. The input module 15 receives signal from the ARM 11 to control the running number of the performing equipment 151. The communication module 14 receives signal from the ARM 11 and modulates the signal by the receiving circuit 141 and the PLC circuit 142, and then transmit the signal to the communication unit 216. The communication unit 216 demodulates the signal from the communication module 14 and transmits to the MUC module 212. The MUC module 212 receives signal from the communication module 14 to control the driving module 22 to drive the light source module 22 to emit light.

The embodiments shown and described above are only examples. Many details are often found in the art such as the other features of a light emitting diode street lamp control system. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. A light emitting diode (LED) street lamp control system, comprising:

a control module, the control module comprising a power module providing power for the control module;

an LED street lamp unit coupled with the control module and comprising:
  a dimmer module coupled with the control module and configured to receive a signal from the control module, and transmit a signal to the control module;
  a driving module coupled to the dimmer module, and configured to be controlled by the dimmer module; and
  a light source module coupled with the driving module, and configured to be controlled by the driving module,
  wherein the control module comprising an Acorn machine (ARM), a communication module coupled with the ARM; the dimmer module further comprises a Microcontroller Unit (MCU), a communication unit coupled with the MCU, the communication module coupled with the communication unit by a power line, a signal is transmitted from the ARM, via the communication module to the MCU via the communication unit.

2. The LED street lamp control system of claim 1, wherein the ARM is a system board and is configured to a Linux system.

3. The LED street lamp control system of claim 2, wherein the ARM also can provide peripheral interface for the Linux system.

4. The LED street lamp control system of claim 1, wherein the communication module comprises a Power Line Communication (PLC) circuit and a receiving-sending circuit, the communication module modulates and demodulates signals between the ARM and the PLC circuit and the receiving-sending circuit.

5. The LED street lamp control system of claim 1, wherein the control module further comprises a General Packet Radio Service (GPRS) coupled with the ARM, the GPRS couples the control module with a wireless base station, transmits a signal from the ARM to the internet, via the wireless base station and a computer, and further transmits a signal from the internet, via the wireless base station and the computer, to the ARM.

6. The LED street lamp control system of claim 1, wherein the control module further comprises a collection module and an input module coupled with the ARM.

7. The LED street lamp control system of claim 6, wherein the collection module is further coupled with a plurality of developing equipment and receives a signal from the developing equipment to transmit to the ARM.

8. The LED street lamp control system of claim 6, wherein the collection module is a RS-485 module.

9. The LED street lamp control system of claim 1, wherein the dimmer module comprises a measuring module and a dimmer unit coupled with the MCU, the measuring module monitors a voltage, current and power of the light source module to transmit to the MCU, the dimmer unit receives a signal from the MCU to transmit to the driving module to control the luminous state of the light source module.

* * * * *